Jan. 6, 1925.                                                                                       1,522,068
M. W. MORGAN
SPEED TRANSFORMING MECHANISM
Original Filed Nov. 11, 1922        2 Sheets-Sheet 1

Patented Jan. 6, 1925.

1,522,068

UNITED STATES PATENT OFFICE.

MERTON W. MORGAN, OF BALTIMORE, MARYLAND, ASSIGNOR TO POOLE ENGINEERING & MACHINE CO., OF BALTIMORE, MARYLAND.

SPEED-TRANSFORMING MECHANISM.

Application filed November 11, 1922, Serial No. 600,196. Renewed May 15, 1924.

*To all whom it may concern:*

Be it known that I, MERTON W. MORGAN, a citizen of the United States, residing at Baltimore, State of Maryland, have invented a new and useful Improvement in Speed-Transforming Mechanism, of which the following is a specification.

My invention relates to improvements in speed and power transforming machines in which a driving gear pinion cooperating with an internal gear is employed to raise or lower the speed or power from one shaft to another shaft; and the objects of my invention are, first, to provide means to raise or lower the speed or power from a driving motor; second, to provide means to receive the thrust from the gear shafts and to keep the gears in alignment; third, to provide continuously lubricated gearing and shaft bearings; and, fourth, to provide a means for the escape of the lubricating oil gases.

I attain the objects of my invention by the mechanism illustrated in the accompanying drawings in which—

Figure 1:
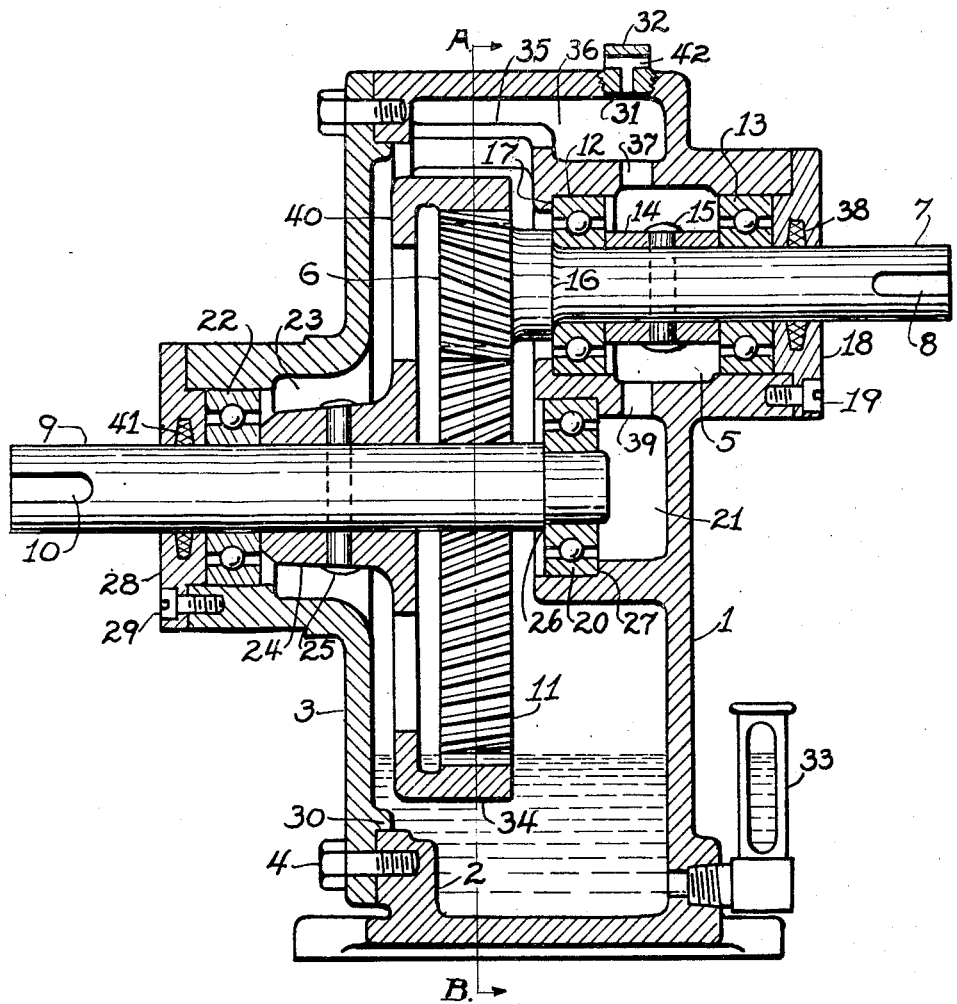
Figure 2:
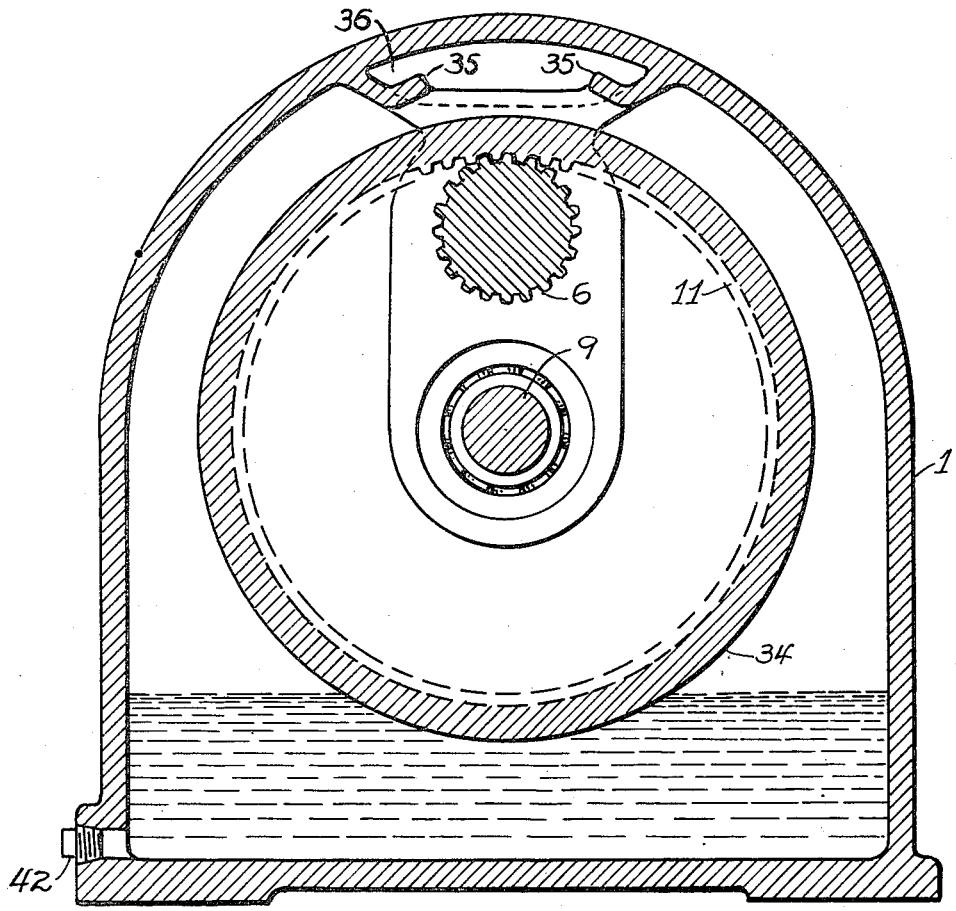

Figure 1 is a vertical section of the entire machine and Fig. 2, a vertical section on the line A—B of Fig. 1.

Similar numerals refer to similar parts throughout the several views.

Refering to the drawings, the numeral 1 is a casing comprising a base, an end wall on which a pocket is centrally disposed for the insertion therein of a shaft bearing, a bore in the said end wall for the passing therethrough of a gear pinion and a shaft and for the insertion therein of shaft bearings, side walls and a top wall on the inner side of which an oil reservoir is formed, and an open end having an inwardly extending flange 2 opposite the aforesaid end wall. The casing cover 3 is fastened to the casing 1 by the bolts 4 and is held in a centrally disposed position on the said casing by the insertion of the circular extension 30 into the open end of the said casing. The casing 1 and the casing cover 3 form an enclosing body wherein all of the speed or power transforming mechanism operates and in which a reservoir is formed for the lubricating oil. The casing 1 is apertured as a 5 for the passing therethrough of the gear pinion 6 integral with the shaft 7 on the end of which a keyway 8 is provided for the coupling of the said shaft to a driving motor to impart rotation to the speed transformer or a pulley may be attached on the shaft 7 by means of the keyway 8 to drive a machine when the driving motor is coupled to the shaft 9 by means of the keyway 10. Rotation would thereby be imparted to the internal gear 11, the pinion 6 and the shaft 7. The speed of the particular shaft to which the driving motor is coupled will be the same as of the motor and the speed transmitted to and by the other of the two shafts will be governed by the ratio of the gearing used.

Shaft 7 is mounted for revolution in bearings 12 and 13, provided with suitable balls as illustrated in Fig. 1 but it is, of course, obvious that other types of bearings might be employed if desired. These bearings also act as thrust bearings for the ends of the collar 14, fastened to the shaft 7 by the pin 15, and the shoulder 16 of the shaft 7 to bear against and to receive the lateral thrust caused by the angle of the spiral teeth of the gear 6 according to the direction of rotation of the shaft 7. To hold these bearings in their proper positions laterally thereby controlling the alignment of the pinion 6 with the internal gear 11 there is provided the shoulder 17 in the bore 5 of the casing 1 and the bearing plate 18 with an extension inserted into the bore 5 against the bearing 13 and fastened to the casing 1 by the bolts 19.

For the shaft 9 of the internal gear 11 to revolve in there is provided the bearing 20 in the pocket 21 of the casing 1 and the bearing 22 in the bore 23 of the casing cover 3. These bearings also act as thrust bearings for the hub 24 of the internal gear, fastened to the shaft 9 by the pin 25, and the shoulder 26 to bear against and to receive the lateral thrust caused by the angle of spiral teeth of the internal gear 11 according to the direction of rotation of the shaft 9. To hold these bearings in their proper positions laterally, thereby controlling the alignment of the internal gear 11 with the pinion 6 there is provided the shoulder 27 in the pocket 21 of the casing 1 for the bearing 20 to bear against, and the bearing plate 28 with an extension inserted into the bore 23 of the casing cover 3 against the bearing 22 and fastened to the casing cover by the bolts 29.

When a driving motor running at a certain speed is coupled to the shaft 7, speed and power from the motor are thereby transferred through the pinion 6 in mesh with the internal gear 11 to the shaft 10 on which a pulley may be attached to drive a machine, and to reduce the friction between the various parts of this mechanism, lubricating oil is first poured into the casing 1 through the tapped hole 31 which receives the vent plug 32, until the level of the oil in the gauge 33 denotes that the internal gear 11 is submerged enough to cover the bottom teeth thereon. As the internal gear is rotated, the lubricating oil is continuously carried upwardly in the tooth spaces of the internal gear to lubricate the gearing and is also carried on the periphery 34 of the said internal gear and thrown by centrifugal force from the said periphery over the projections 35 and into the reservoir 36 in the top of the casing 1 from which by gravitation, the oil passes through the opening 37 into the bore 5 of the casing and there lubricates the bearings 12 and 13. The oil is prevented from going out of the casing by means of the felt ring 38 in the bearing plate 18. From the bore 5 the oil passes through the hole 39 into the pocket 21 of the casing and there lubricates the bearing 20 and then through the said bearing back to the bottom of the casing. The bearing 22 is lubricated by means of the oil being thrown from the side 40 of the rotating internal gear 11 onto the top part of the inside surface of the end wall of the casing cover 3 and from there is carried by gravitation onto the conical surface of the hub 24, being thrown therefrom onto the casing forming bore 23 and from there it passes to the bearing 22 and is prevented from going out of the casing cover 3 by means of the felt ring 41 in the bearing plate 28. It will be obvious that the oil being thrown from 24 will also naturally splash to the bearing 22. In the plug 32 at the top of the casing 1, vent holes 42 are provided for the escape of the lubricating oil gases in the casing to the atmosphere. For draining the lubricating oil from the casing 1 the drain plug 43 is provided in the bottom of the side wall of the said casing as shown in Fig. 2.

Having described my invention, what I claim as new, and desire to secure by Letters Patent is:

1. In a speed transforming mechanism, the combination of a fixed casing having a base, an end wall on which a pocket is disposed for the insertion therein of a shaft bearing, a bore in the said end wall for the passing therethrough of a gear pinion and a shaft and for the insertion therein of shaft bearings, side and top walls on which an oil reservoir is formed, and an open end opposite the aforesaid end wall, of a casing cover which is bolted to the open end of the casing and having a bore for the passing therethrough of a shaft and for the insertion therein of a shaft bearing, a driving shaft mounted in one end of the casing, a driven shaft mounted in the said end of the casing and in the aforementioned casing cover opposite the said end of the casing, said driven shaft being centrally disposed in the casing and the casing cover and the driving shaft being mounted in the casing out of alignment with the driven shaft, shaft bearings supported in the aforesaid casing and the casing cover, and a spiral tooth gear pinion on the driving shaft meshing with an internal spiral tooth gear on the driven shaft.

2. In a speed transforming mechanism, the combination of a fixed casing having in its top wall an oil filling hole, a plug inserted into the said hole and apertured for the escape of oil gases, an oil reservoir, and holes in the bottom wall of the reservoir for the passage of lubricating oil, of a bearing plate bolted to the casing and provided with a felt ring, a casing cover, a bearing plate bolted to the casing cover and provided with a felt ring, a driving shaft, a driven shaft provided with an internal tooth gear, said driven shaft being centrally disposed in the casing and the casing cover and the driving shaft being mounted in the casing out of alignment with the driven shaft, shaft thrust bearings, and a tooth gear pinion on the driving shaft meshing with the before mentioned internal tooth gear on the driven shaft.

In testimony whereof, I have signed my name to this specification in the presence of two subscribing witnesses.

MERTON W. MORGAN.

Witnesses:
W. A. HARMAN,
V. PANETTIERE.